(12) United States Patent
Pilipauskas et al.

(10) Patent No.: US 8,671,872 B2
(45) Date of Patent: Mar. 18, 2014

(54) PRODUCTION COATER WITH EXCHANGEABLE DRUMS

(75) Inventors: Timothy C. Pilipauskas, Arlington Heights, IL (US); Shawn Garcia, Schaumburg, IL (US); Jean Y. Le Floc'h, Palatine, IL (US)

(73) Assignee: Thomas Engineering Inc., Hoffman Estates, IL (US)

( * ) Notice: Subject to any disclaimer, the term of this patent is extended or adjusted under 35 U.S.C. 154(b) by 574 days.

(21) Appl. No.: 12/493,710

(22) Filed: Jun. 29, 2009

(65) Prior Publication Data

US 2010/0206223 A1    Aug. 19, 2010

Related U.S. Application Data

(60) Provisional application No. 61/152,835, filed on Feb. 16, 2009.

(51) Int. Cl.
*B05D 3/08* (2006.01)

(52) U.S. Cl.
USPC ............ 118/13; 118/19; 118/23; 118/26; 118/28; 118/303; 118/320; 118/418

(58) Field of Classification Search
USPC .......... 118/13, 19, 23, 26, 28, 320, 303, 418; 427/2.14, 242; 99/494; 34/603, 602; 366/227, 59, 228, 229; 69/30, 31; 68/208; 451/326, 328
See application file for complete search history.

(56) References Cited

U.S. PATENT DOCUMENTS

| | | | |
|---|---|---|---|
| 1,850,576 A | | 3/1932 | Zimmerman |
| 3,487,840 A | * | 1/1970 | Stenzel et al. ............... 134/112 |
| 4,245,580 A | * | 1/1981 | Okawara ......................... 118/19 |
| 4,560,462 A | | 12/1985 | Radford et al. |
| 4,639,383 A | | 1/1987 | Casey |
| 4,817,006 A | | 3/1989 | Lewis |
| 5,376,175 A | | 12/1994 | Long et al. |
| 6,530,254 B2 | * | 3/2003 | Beierling ........................ 72/113 |
| 6,557,486 B2 | * | 5/2003 | Giogoli ........................... 118/19 |
| 7,614,359 B2 | * | 11/2009 | Hasegawa et al. ............. 118/13 |
| 7,908,992 B2 | * | 3/2011 | Rowe et al. .................... 118/19 |

OTHER PUBLICATIONS http://oystar.manesty.com/Images/XLLabBrochure.pdf, Manesty XL Lab 01 XL Lab02 brochure (online), Mar. 3, 2005 (8 pages).

* cited by examiner

*Primary Examiner* — Laura Edwards
(74) *Attorney, Agent, or Firm* — Pauley Petersen & Erickson

(57) ABSTRACT

A coater for coating a material with a solution or a suspension includes an access door and a process port separately openable within a housing. A rotating coating drum is removably connected with respect to the coater and the coater is configured for exchange of drums having a wide range of production capacities.

15 Claims, 20 Drawing Sheets

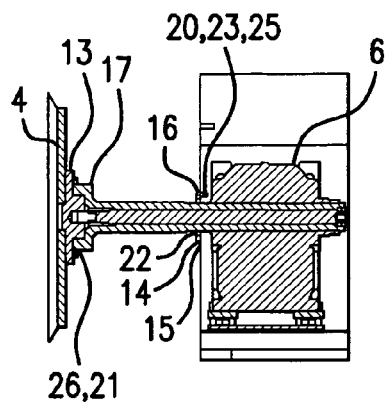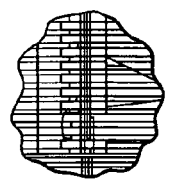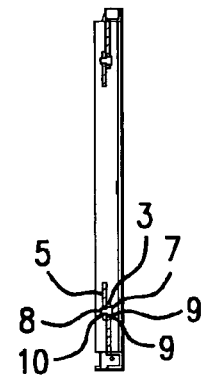
FIG.8　　　FIG.9　　　FIG.10
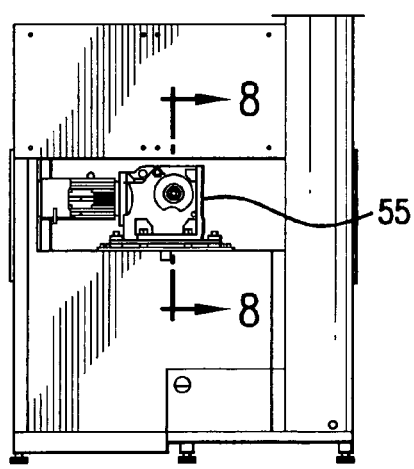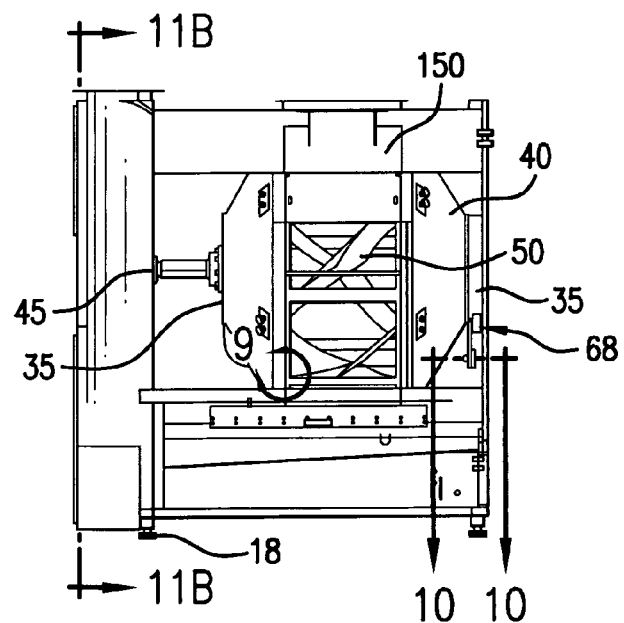
FIG.11　　　FIG.12

PRODUCTION COATER WITH EXCHANGEABLE DRUMS

CROSS REFERENCE TO RELATED APPLICATION

This Application claims the benefit of U.S. Provisional Patent Application Ser. No. 61/152,835, filed 16 Feb. 2009, which is incorporated herein by reference.

BACKGROUND OF THE INVENTION

1. Field of the Invention

This invention relates to a coating apparatus for coating a material to be coated with a solution or a suspension.

2. Description of Prior Art

Fully-perforated side-vented coating pans and coaters have been in use since the early 70's. In the past, such coaters for coating pharmaceuticals and other substrates were expensive, complex, difficult to clean and included a multiplicity of parts. The apparatus of the prior art are inherently expensive, inflexible, difficult to operate properly, difficult to clean and sized to a specific application. Traditional coaters can only adapt to a single coating drum resulting in an inability to handle a wide range of processes & batch sizes in a single coater.

A problem associated with conventional coating apparatus for coating a material with a solution is that they require complex and single-purposed apparatus that are very flexible in operation. Another problem associated with conventional coating apparatus for coating a material with a solution is that they require the use of equipment that are not easily cleaned. Still another problem associated with conventional coating apparatus for coating a material with a solution is that they cannot be disassembled quickly without the use of hand tools or other tools. More specifically, existing coaters include coating drums that are difficult, if not impossible, to extract and/or insert. Yet a further problem associated with conventional coating apparatus is that they foul with product build-up and tend to disrupt the coating process, adversely affecting product quality and thereby leading to disqualified or discarded batches.

For the foregoing reasons, there has been defined a long felt and unsolved need for a coating apparatus for coating a material to be coated with a solution that is easily installed, comparatively inexpensive to manufacture and maintain and adjustable to accommodate a variety of applications. In contrast to the foregoing, the present invention constitutes a coating apparatus for coating a material to be coated with a solution that seeks to overcome the problem discussed above while at the same time providing a simple relatively easily constructed apparatus and method that is readily adapted to a variety of applications.

SUMMARY OF THE INVENTION

A coater for coating a material with a solution or a suspension includes a housing and an internal coating drum, referred to as a "drum" herein, that is rotatable to coat cores or other material to be coated with the solution or suspension. The drum is preferably removably connected with respect to a drive motor. A support is positioned within the housing to permit rotation of an access end of the drum. In addition, an access door is preferably positioned in the housing at the access end of the drum and permits removal and replacement of the drum.

A cradle may be removably positioned within the housing and may include an integrated support in addition or in lieu of a support, such as a trunnion bar, that is removably positioned within the housing. The cradle may be inserted and/or removed from the housing along a plurality of rollers positioned along the cradle to permit the cradle to slide in and out of the housing.

The drums as described herein are preferably production capacity and may range between approximately 50 liters and more than 1200 liters. As a result, a second drum may be exchangeable with an existing drum. A coupling on a drive end of the drum may be quickly decoupled to permit removal and exchange of the drum from the coater.

The coater as described may additionally include a process port positioned within the access door so that each of the process port and the access door are separately openable with respect to the housing.

BRIEF DESCRIPTION OF THE DRAWINGS

These and other objects and features of this invention will be better understood from the following detailed description taken in conjunction with the following generalized and simplified drawings, wherein:

FIG. 8 is a section view of the drum and plenum assembly shown in FIG. 5, taken along section 8-8 shown in FIG. 11;

FIG. 9 is a detail view of weld locating pins used in the plenum assembly shown in FIG. 12;

FIG. 10 is a section view of the plenum assembly shown in FIG. 5, taken along section 10-10 shown in FIG. 12

FIG. 11 is a section view of a drive assembly, taken along section 11-11 shown in FIG. 12;

FIG. 12 is a section view of the drum and plenum assembly shown in FIG. 5, taken along section 12-12 shown in FIG. 7;

DETAILED DESCRIPTION OF PREFERRED EMBODIMENTS

Figure 1:
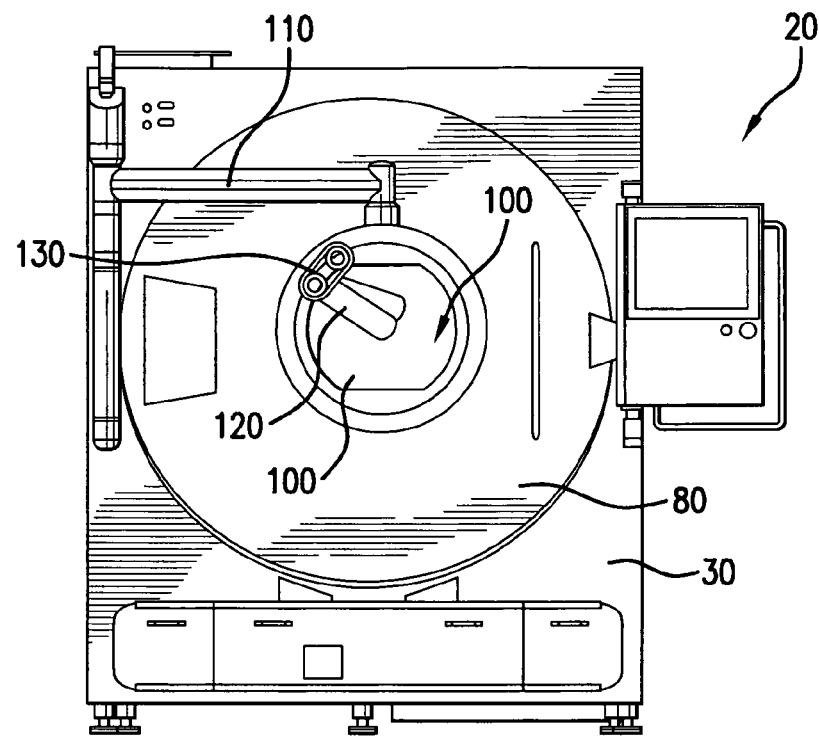
FIG. 1 is a front view of a coater according to one preferred embodiment of this invention.
Figure 2:
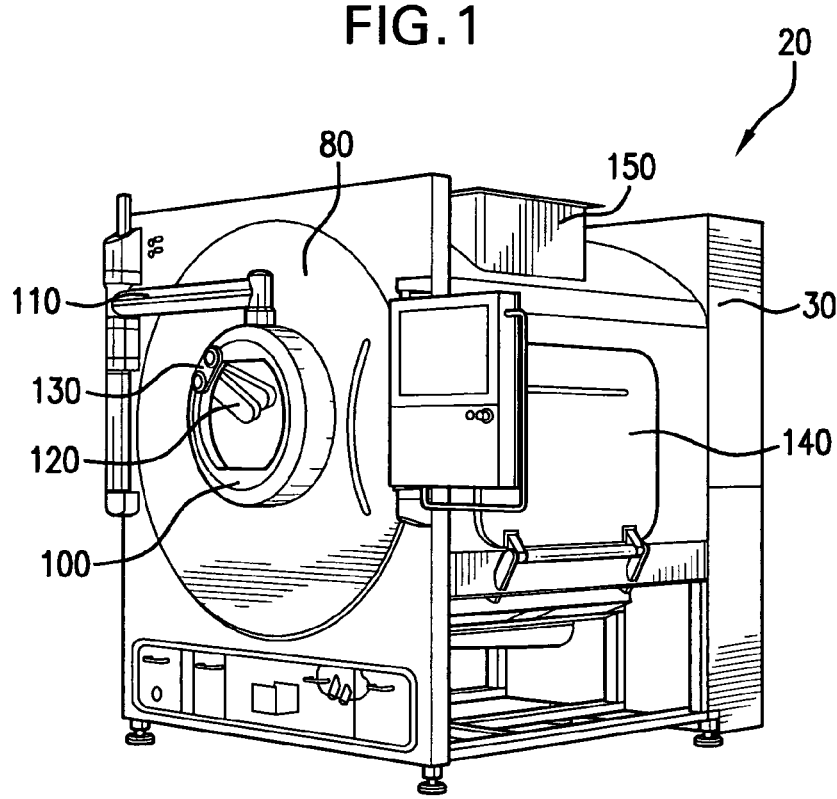
FIG. 2 is a front isometric view of the coater shown in FIG. 1.
Figure 3:
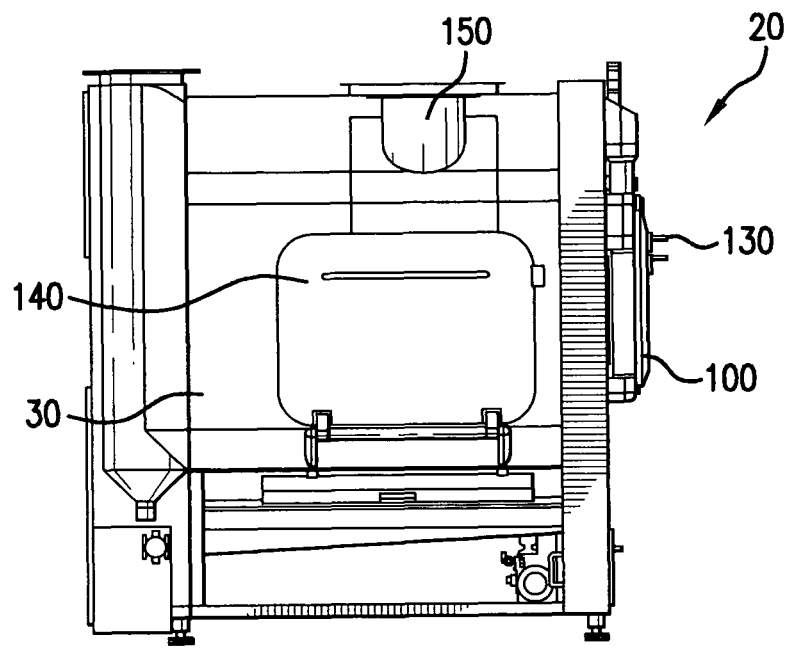
FIG. 3 is a left side view of the coater shown in FIG. 1.
Figure 4:
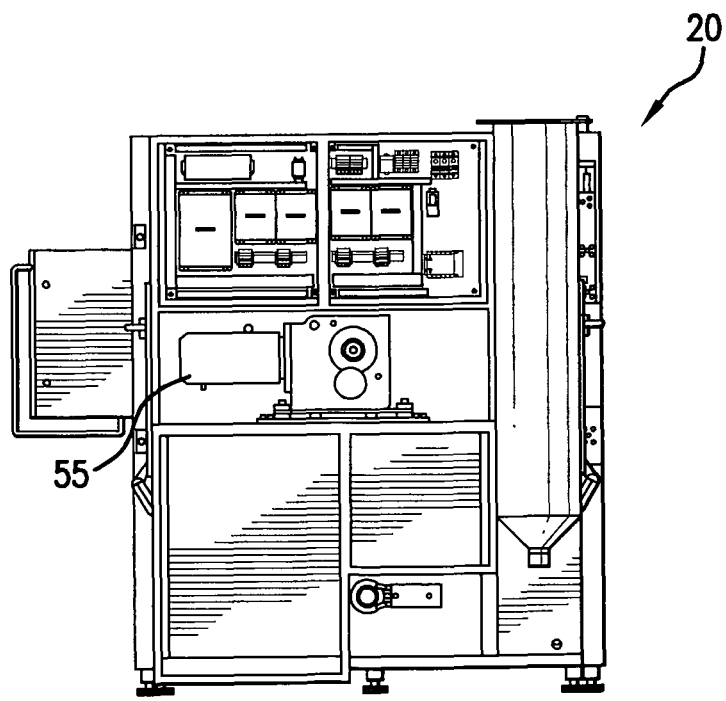
FIG. 4 is a rear view of the coater shown in FIG. 1.

FIGS. 1 through 35 illustrate various preferred embodiments of the present invention. The apparatus described below is a combination of features, processes and software that significantly enhance the utilization of a coater and provide a much greater flexibility in the use of the equipment.

FIGS. 1-4 show coater 20 for coating pharmaceutical tablets and similar applications, preferably with a solution or a suspension. Coater 20 is preferably a production scale coater capable of production in the range of approximately 50 to approximately 1200 liters of material. Coater 20 preferably includes housing 30 containing drum 40, preferably a production sized coating drum, creating a generally cylindrical or frusto-conical coating vessel. Drum 40 is preferably rotatable within housing 30 resulting in an internal mixing chamber 42 within drum 40. Housing 30 is preferably configured to provide a sealed, sanitary enclosure for the mixing and coating operation.

Drums 40 are best shown in FIGS. 12-19. As described in more detail below, drum 40 is preferably removable and replaceable with drums 40 having different configurations and/or applications. Drum preferably includes access end 35, preferably positioned on an accessible side of housing 30 and drive end 38, preferably aligned on an opposite side of drum 40 from access end 35.

Drums 40 are powered with drive motor 55 that is preferably attached to drum 40 on drive end 38 through a removable coupling 45 at a rear portion of coater 20. Because of its large size and mass, drum 40 is preferably supported at drive end 38 at coupling 45 and separately at access end 35 by support 68.

Figure 5:
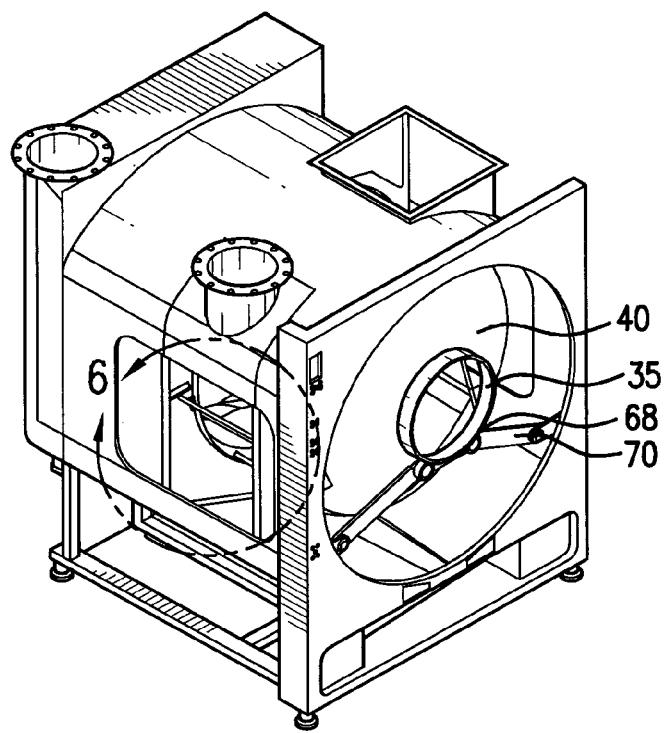
FIG. 5 is a side isometric view of a drum and plenum assembly for use with a coater according to one preferred embodiment of this invention.
Figure 6:
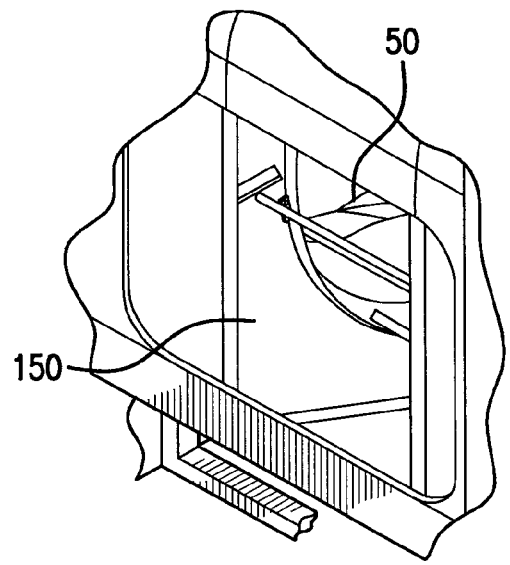
FIG. 6 is a detail view of a plenum of the drum and plenum assembly shown in FIG. 5.

Support 68 is preferably configured to permit rotation of access end 35 of drum 40. For instance, as shown in FIG. 5, drum 40 preferably rotates at a front edge of access end 35 on support 68, such as trunnion bar 70. Trunnion bar 70 may be removable and/or hinged to facilitate removal and replacement of drum 40. One or more rollers 75 may be positioned on support 68, such as along trunnion bar 70 shown in FIG. 35, to permit rotation of drum 40 relative to the support 68.

As shown in FIGS. 1-4, access door 80 is preferably positioned in housing 30 at access end 35 of drum 40. As shown in FIGS. 1-4, process port 100 is preferably positioned within access door 80 so that process port 100 is separately openable within access door 80. Access door 80 preferably permits removal and replacement of drum 40, but is not necessarily intended to permit filling and emptying of drum 40. Replacement of drum 40 may involve swapping a first drum with a second drum having a different size than the first drum.

Figure 21:
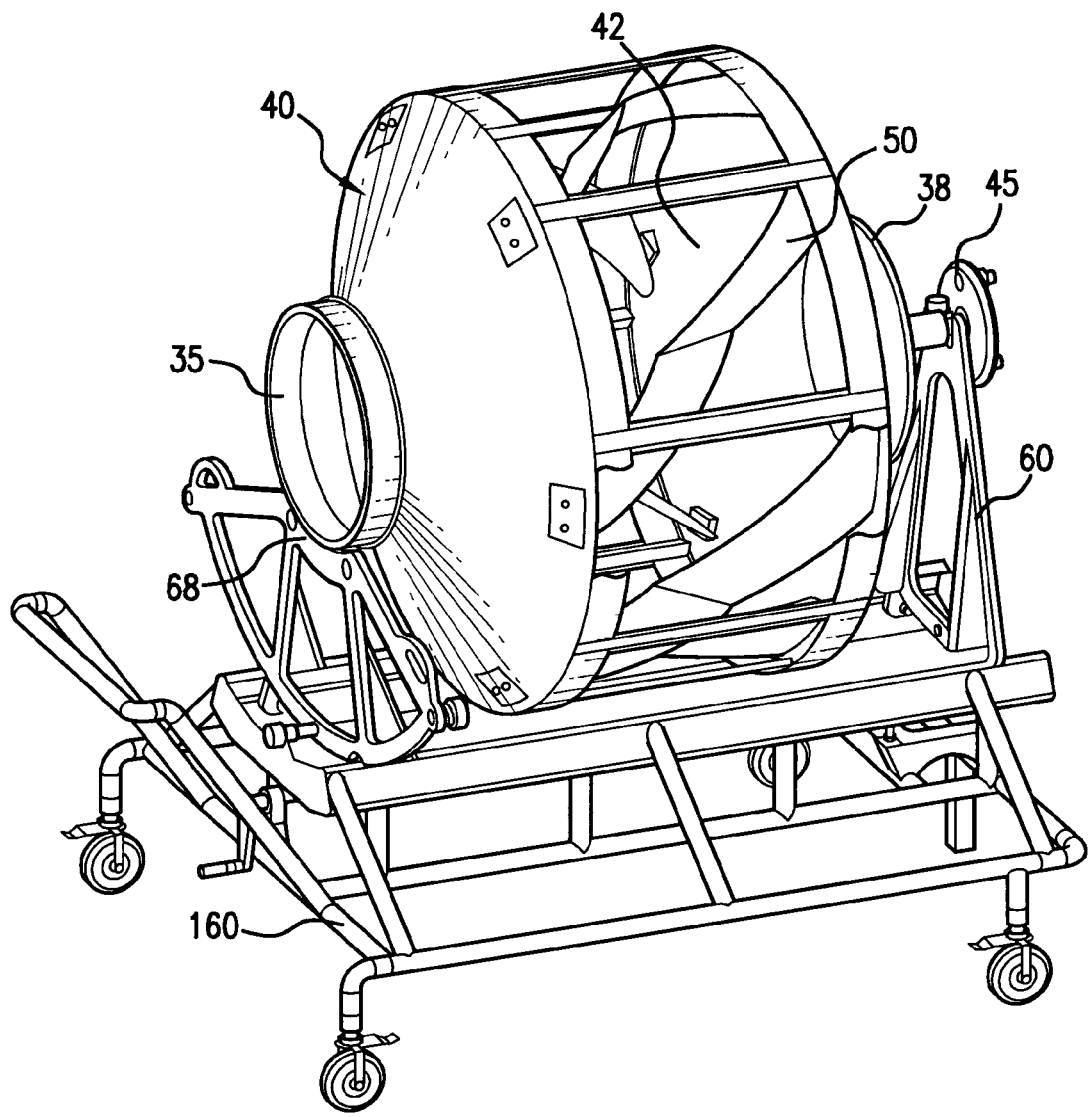
FIG. 21 is a side isometric view of a cradle, a dolly and a drum according to one preferred embodiment of the invention.
Figure 22:
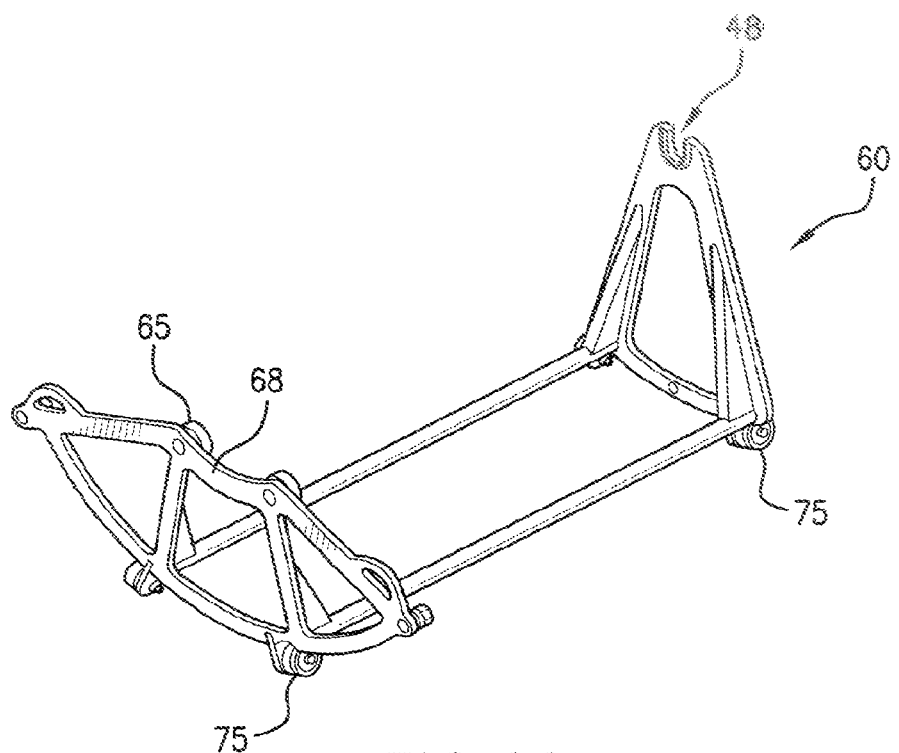
FIG. 22 is a front isometric view of the cradle shown in FIG. 21.

According to one preferred embodiment, cradle 60 is removably positioned within housing 30. In such an arrangement, support 68 may be integrated along an end of cradle 60 corresponding with access end 35 of drum 40. As shown in FIGS. 21 and 22, a plurality of rollers 65 may be positioned along cradle 60 to permit cradle 60 to slide in and out of housing 30. Following removal from housing 30, a different drum 40 may be swapped onto cradle 60 for replacement in coater 20. As shown in FIG. 22, cradle 60 preferably accommodates support 68 which may be integrated with cradle 60 or separately incorporated, such as trunnion bar 70. In addition, cradle 60 may include a slot 48 or similar accommodation for drive end 38 of drum 40, specifically a drive shaft or coupling 45.

Figure 19:
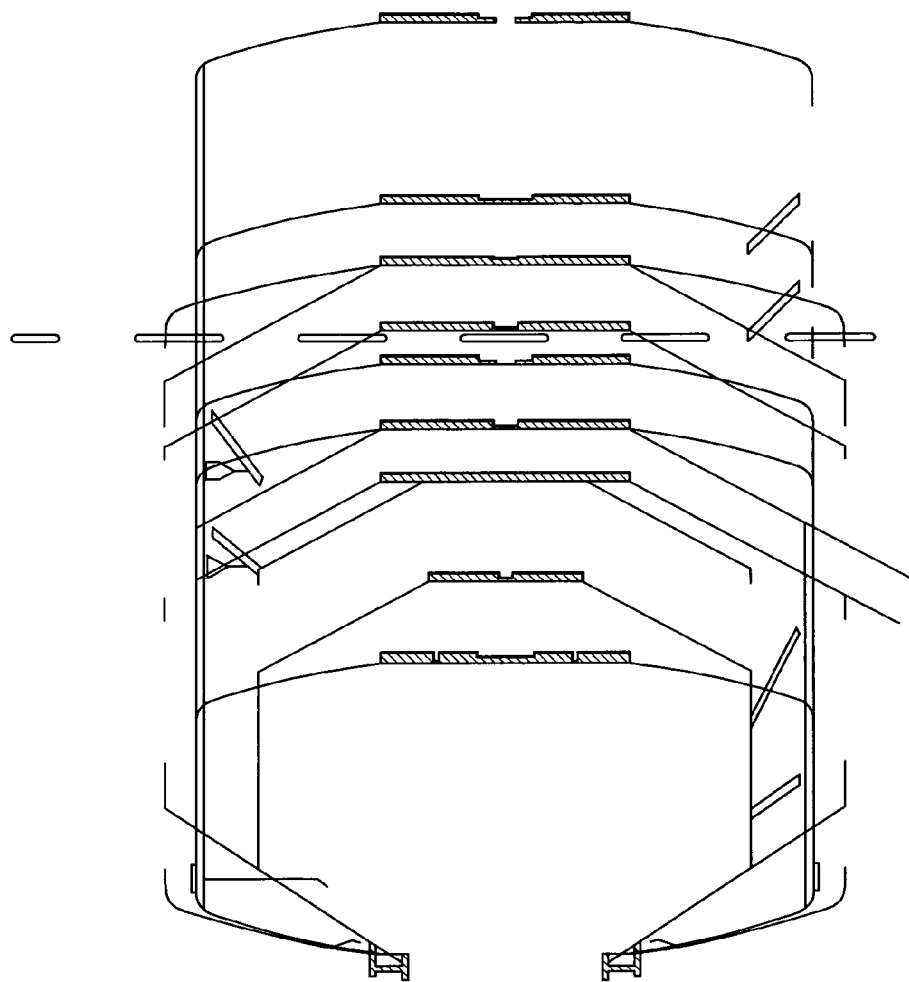
FIG. 19 side cross-sectional view of variously sized coating drums for use in connection with a coater according to one preferred embodiment of this invention.
Figure 20:
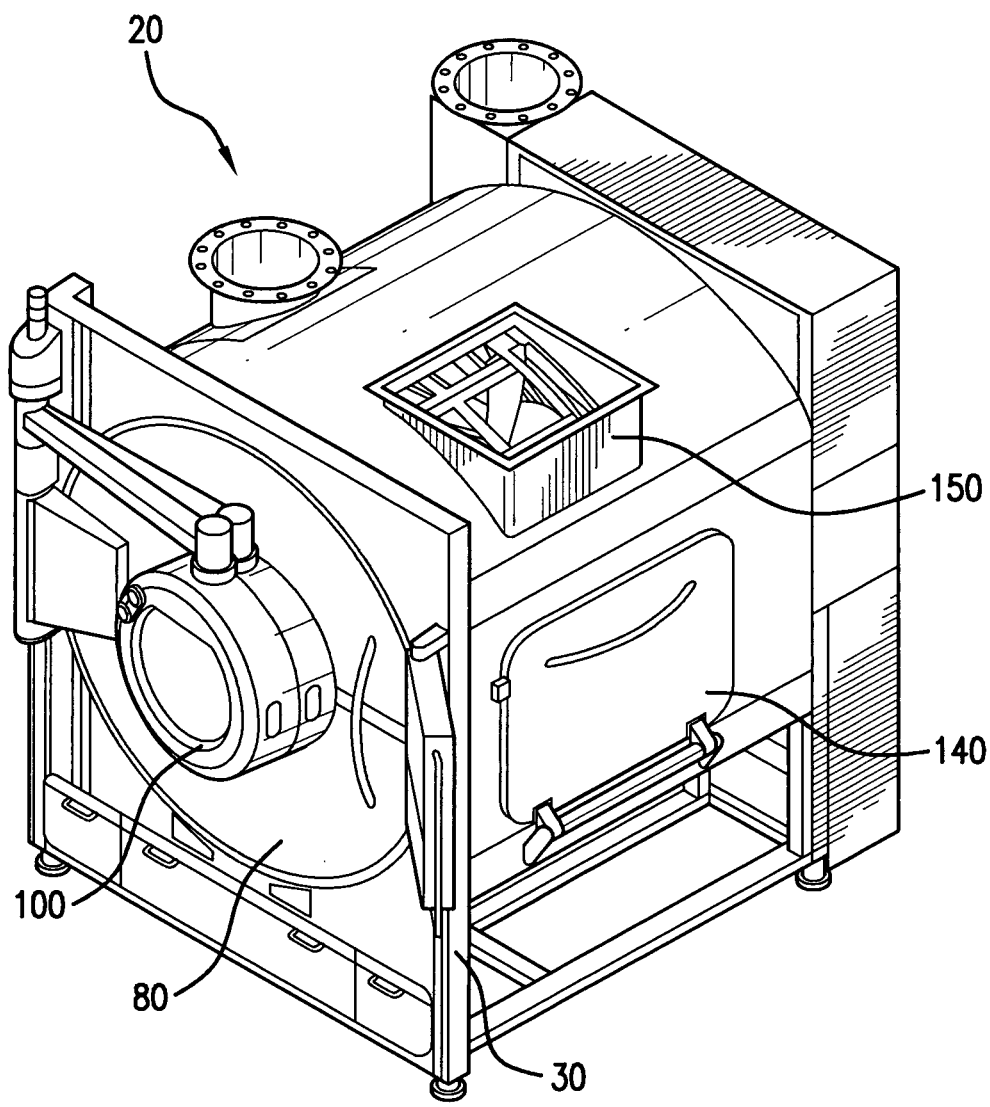
FIG. 20 is a front isometric view of a coater according to one preferred embodiment of the invention.

Coater 20 as described is preferably a production grade coater. That is, the drums 40 preferably include a capacity of at least approximately 50 liters, or more. FIG. 19 shows a plurality of drum sizes that are preferred for use with the subject invention. Preferably, a range of drum capacities are exchangeable within a single coater 20. Drum capacities preferably range from approximately 100 liters to 300 liters to 1000 liters to 1200 liters or more. As such, a second drum having the same, a larger or smaller capacity is exchangeable with drum 40 in coater 20.

In addition, the coater 20 preferably includes baffles 50 positioned within the coating drum 40. Baffles 50 are preferably removable and replaceable or adjustable depending on the desired configuration or application. Baffles 50 assist in the coating process by evenly distributing the coating solution over the material to be coated.

Coater 20 preferably further includes spray bar 120 extending into mixing chamber 42 of drum 40. Spray bar 120 is preferably externally adjustable from outside housing 30, such as through adjustment device 130, shown in more detail at FIGS. 1-4 and 34. Spray bar 120 disperses a desired coating solution over the material to be coated and may be positioned in a desirable manner to facilitate a desired coating.

The various components of the coater 20 are preferably accessible and viewable from access door 80 and/or process port 100 positioned within access door 80. Process port 100 is preferably connected within access door 80 and permits direct and/or indirect access to mixing chamber 42 of drum 40. Each of access door 80 and process port 100 are preferably independently openable for access to a coating chamber within the coater 20, the coating drum 40 and/or the batch of material within and/or other components within the coater 20, such as the spray bar 120. An extraction arm 110 may be connected through the process port 100 to facilitate supply of process and/or cleaning materials to the coating chamber. An exhaust plenum 150 may further be integrated with a side door 140 and/or sidewall of the coater 20 to facilitate cleaning, either horizontally or vertically. These and other features and components of the invention are described below.

Coater 20 according to a preferred embodiment of this invention improves existing processes and adds versatility and flexibility to coating operations. Coater 20 according to a preferred embodiment of this invention includes an exchangeable process vessel, specifically a coating drum, that may be easily inserted and extracted from the machine, thus providing the ability to support various products and processes in different drums (diameter, volume, materials of construction, form factor, perforations).

Coater 20 according to a preferred embodiment of this invention improves flexibility. Coater 20 preferably includes drum 40 that is exchangeable with one or more alternate or replacement drums 40, including coating drums of various diameters, lengths, capacities and/or form factors that are each designed to fit in a given coater. In addition, coater 20 is structured to accommodate multiple plenums that match the various drum sizes. Further, coater 20 includes spray bar 120 permitting positioning and envelope of movement designed to accommodate the various drum sizes.

Drums 40 are preferably constructed of stainless steel, HASTELLOY, or other suitable material compatible with compounds and/or coating solutions used in coating operations. Drums 40 may further include various levels of polishing, multiple perforation patterns, various perforation sizes and shapes and/or various types of mixing baffles and anti-slide bars. Such multiple configuration enable replaceable drums 40 to match perforation size and shape to various substrates, processes and wash requirements; match perforation pattern to various structural requirements; and permit the processing of tablets, granules, beads, very small tablets and/or other objects. Drums 40 may further include meshed perforations.

According to a preferred embodiment of this invention, coater 40 preferably further includes a plurality of baffles 50 extending through drum 40. Baffles 50 are preferably easily removed and replaced. Alternatively, baffles 50 may be adjustable. A plurality of baffles positioned within drum 40 may be adjustable from outside of housing 30.

Unlike prior art mixing baffles that are welded or permanently attached to the drum and result in an inability to reproduce several mixing patterns in a given coater, baffles 50 according to a preferred embodiment of this invention are sized and configured to be replaced within each drum which is accordingly designed to accommodate various types and sizes of baffles. Coater 20 preferably facilitates replacement of such baffles 50 by permitting external access to mixing chamber 42 and baffles 50 through a front opening, such as access door 80 and/or process port 100.

In addition, coater 20 may permit an extended turndown resulting in an ability to coat at 25% or less of maximum coating volume. Traditional coaters are not designed for turndown and offer only a narrow range of processing in a given drum. Coater 20 preferably includes a positionable spray bar 120 to permit adjustable of spray bar 120 relative to desired bed. In addition, exhaust plenum 150 is preferably adjustable to match a plenum size with a desired bed. In addition, adjustable and/or replaceable baffles 50 may include low profile baffles and high profile baffles which eliminates the potential for baffles 50 that are "coated" at low bed and insufficient mixing at high beds.

As described above, and shown in FIGS. 1-4, coater 20 according to a preferred embodiment of this invention may further include front access to drums 40 through access door 80 and/or process port 100 positioned within access door 80. In such a manner, the front of coater 20 preferably opens to provide full access to drum 40 for extraction, insertion, inspection, baffles access, cleaning, maintenance and cleaning validation. This departs from traditional methods whereby the coating drum is inserted/extracted vertically by removing the coater roof and moving the coater to a maintenance area requiring hoists, lifts and awkward top access to the coater. Such traditional methods may take several days. On the contrary, coater 20 as described herein permits quick and easy insertion/extraction of drums for inspection, maintenance, cleaning and cleaning validation.

Figure 7:
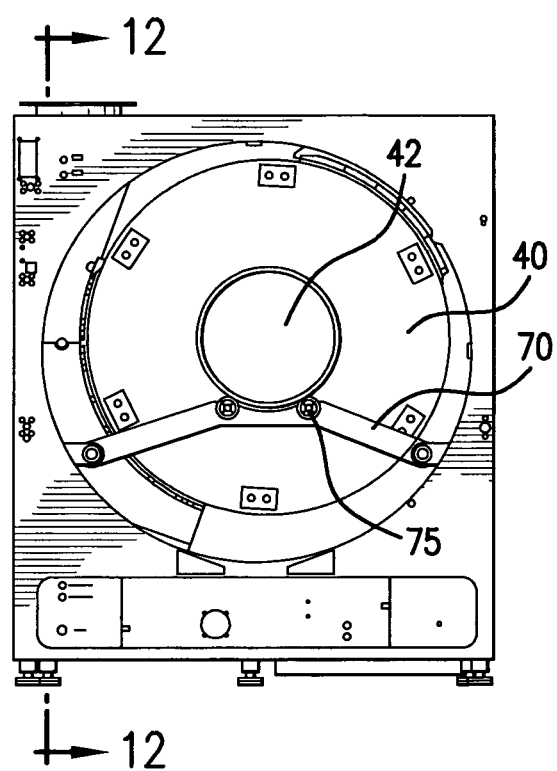
FIG. 7 is a front view of the drum and plenum assembly shown in FIG. 5.
Figure 13:
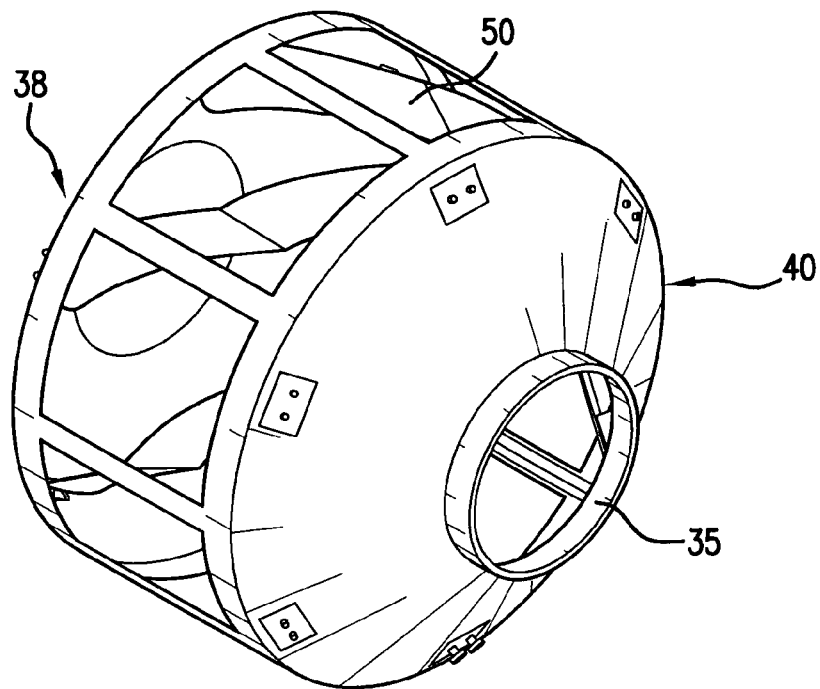
FIG. 13 is a side isometric view of a coating drum and baffle assembly according to one preferred embodiment of this invention.
Figure 14:
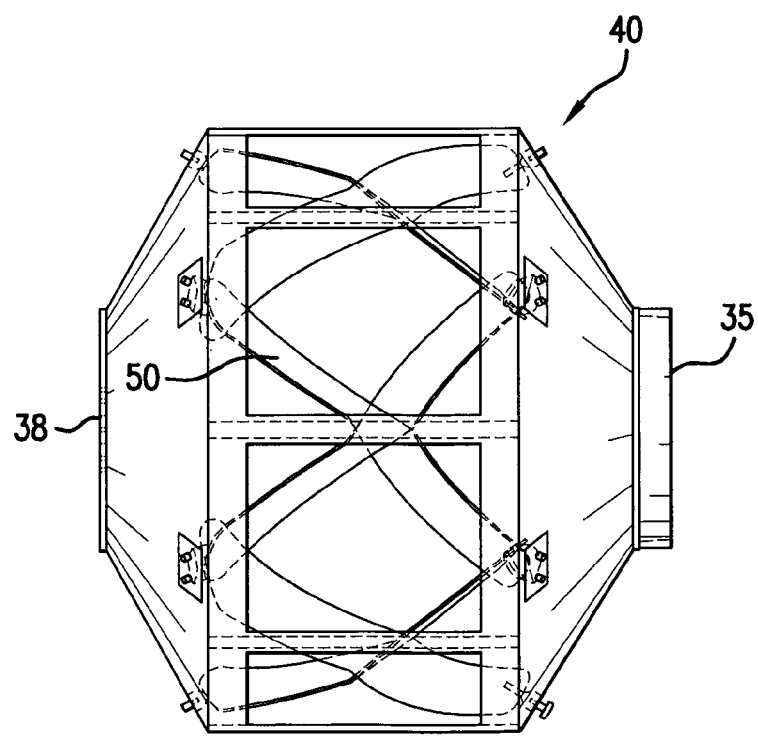
FIG. 14 is a side view of the coating drum shown in FIG. 13.
Figure 15:
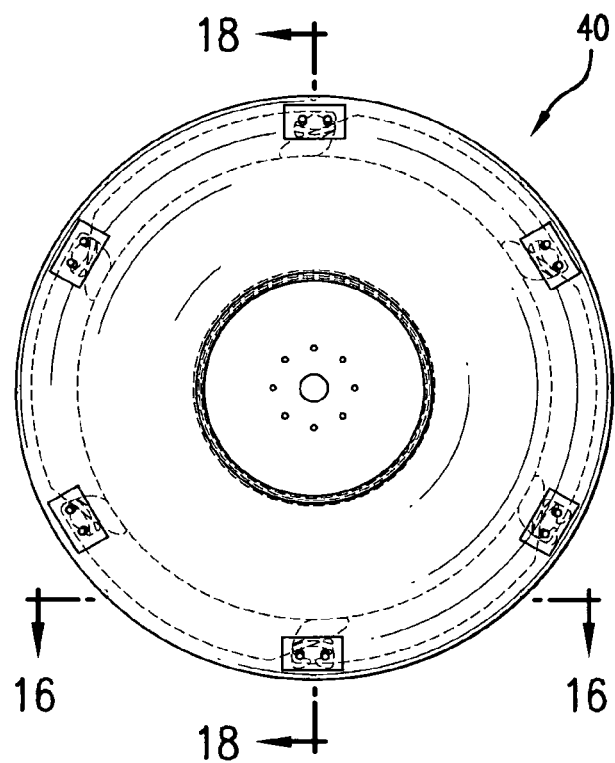
FIG. 15 is a front view of the coating drum shown in FIG. 13.
Figure 16:
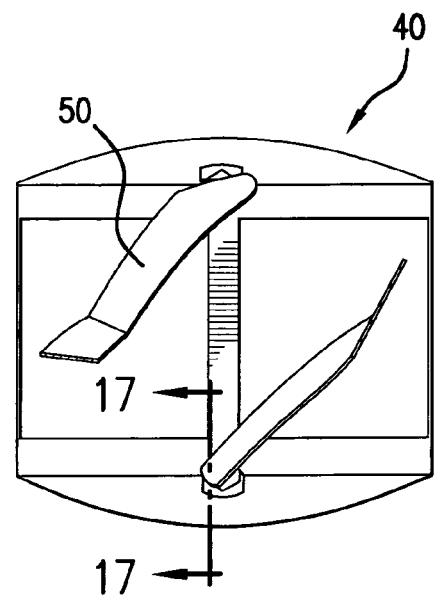
FIG. 16 is a section view of the coating drum shown in FIG. 13, taken along section 16-16 shown in FIG. 15.
Figure 17:
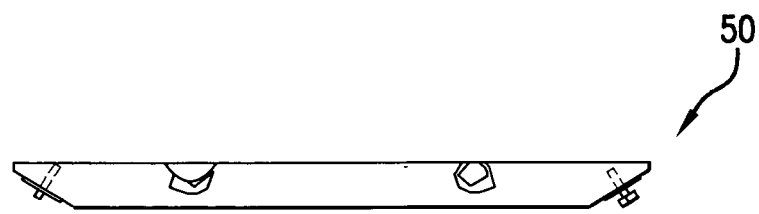
FIG. 17 is a section view of the coating drum shown in FIG. 14, taken along section 17-17 shown in FIG. 16.
Figure 18:
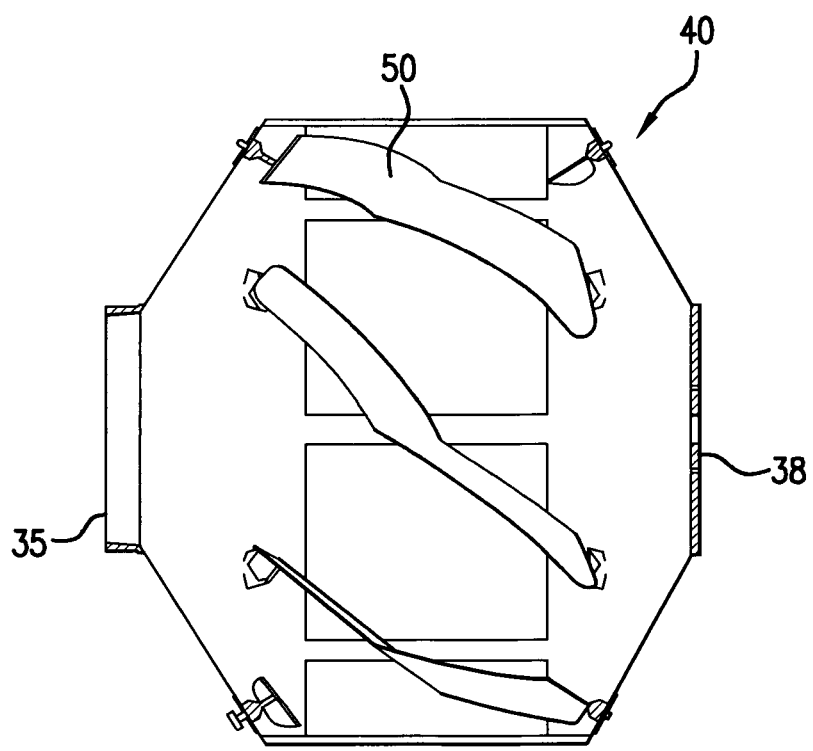
FIG. 18 is a section view of the coating drum shown in FIG. 14, taken along section 18-18 shown in FIG. 15.

Coater 20 preferably includes drum 40 that is positioned across a removable front drum support 68, such as trunnion bar 70 shown in FIG. 7 herein. Removable trunnion bar 70 also permits easy inspection of front cones of drums 40 that, in the past, were not easily inspected. Through the use of a front access door 80, swabbing and cleaning validation of the front cone of drum 40 is permitted. In a similar manner, front external access is permitted to the mixing baffles 50 in coater 20 of the present invention.

Replacement of the drums 40, including coating drum extraction in a lab or coating room may be facilitated with a drive shaft decoupling, either manual or automated. According to a preferred embodiment best shown in FIG. 24, coupling 45 extends from drive end 38 of drum 40 and is removably attached to motor 55. Such coupling 45 permits decoupling of the drive of drum 40 and further facilitates removal of drum 40 through access door 80 thereby eliminating the requirement for high ceilings or movement of the entire coater apparatus into a separate maintenance area. According to a preferred embodiment of this invention, drum 40 may be removed and replaced using a forklift or similar lift in the coating room. Prior to removal of the drum 40, the front support 68, or trunnion bar 70, may be removed to permit access and removal of drum 40.

Figure 23:
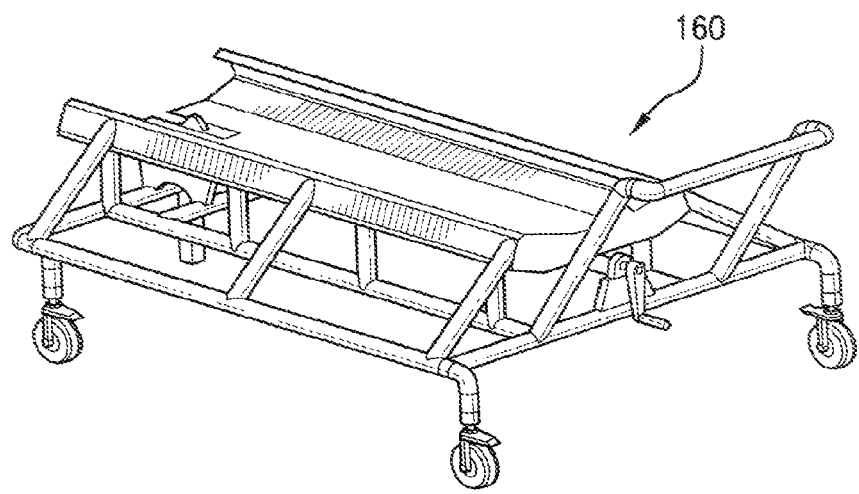
FIG. 23 is a side isometric view of the dolly shown in FIG. 21.
Figure 24:
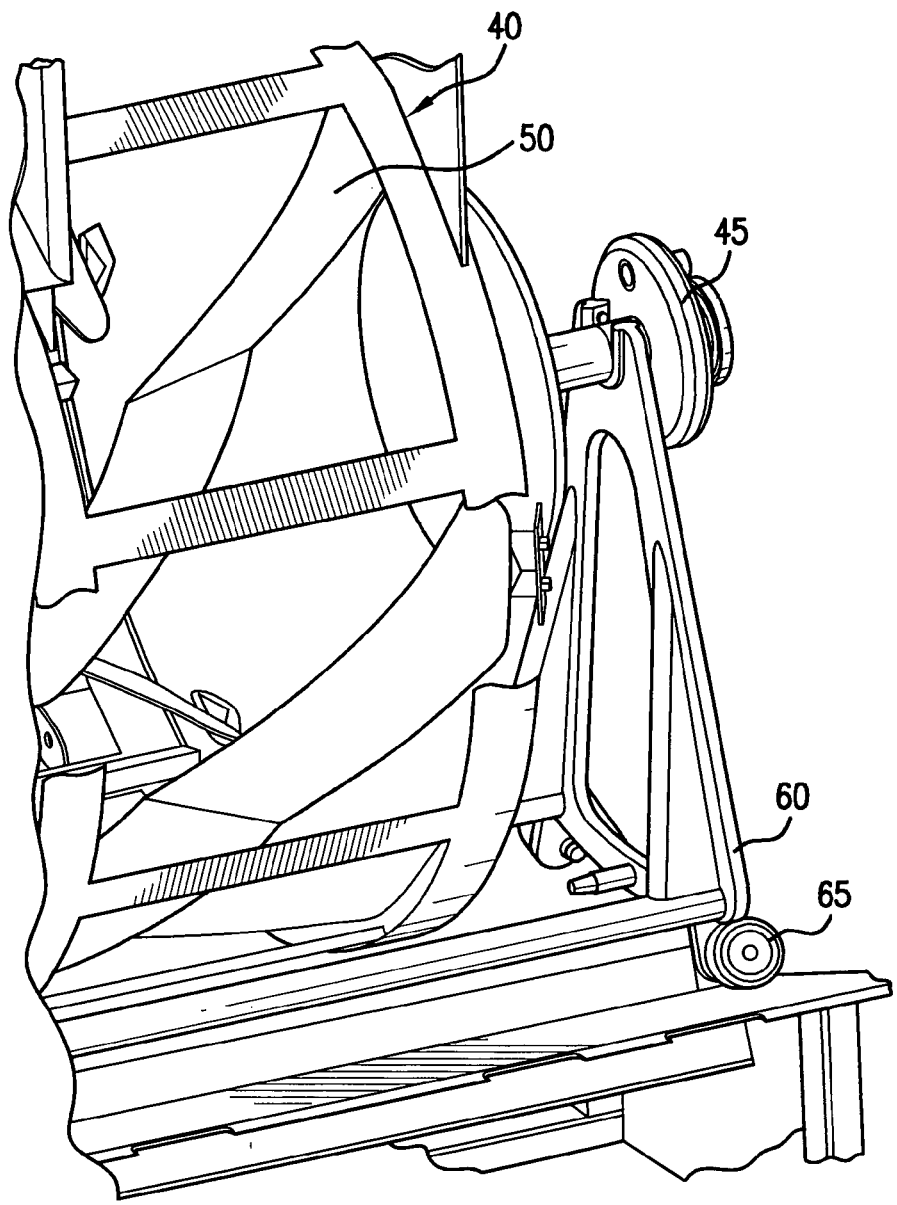
FIG. 24 is close-up side view of a coupling of the drum shown in FIG. 21.
Figure 25:
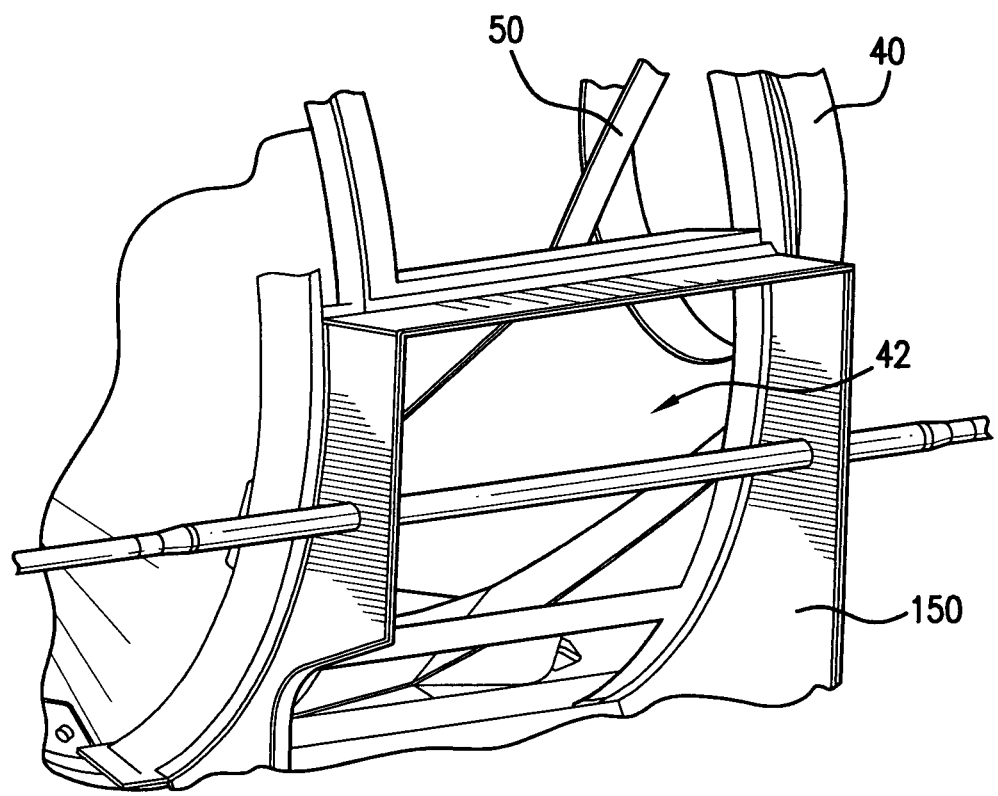
FIG. 25 is a side view of a coater according to one preferred embodiment of the invention showing an exhaust plenum with side door.
Figure 26:
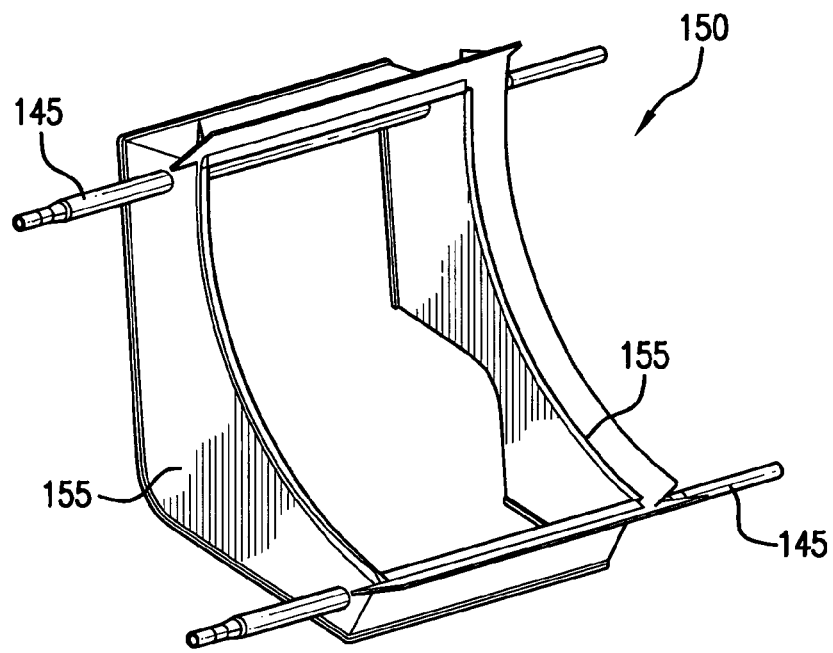
FIG. 26 is a front isometric view of an exhaust plenum according to one preferred embodiment of this invention.
Figure 27:
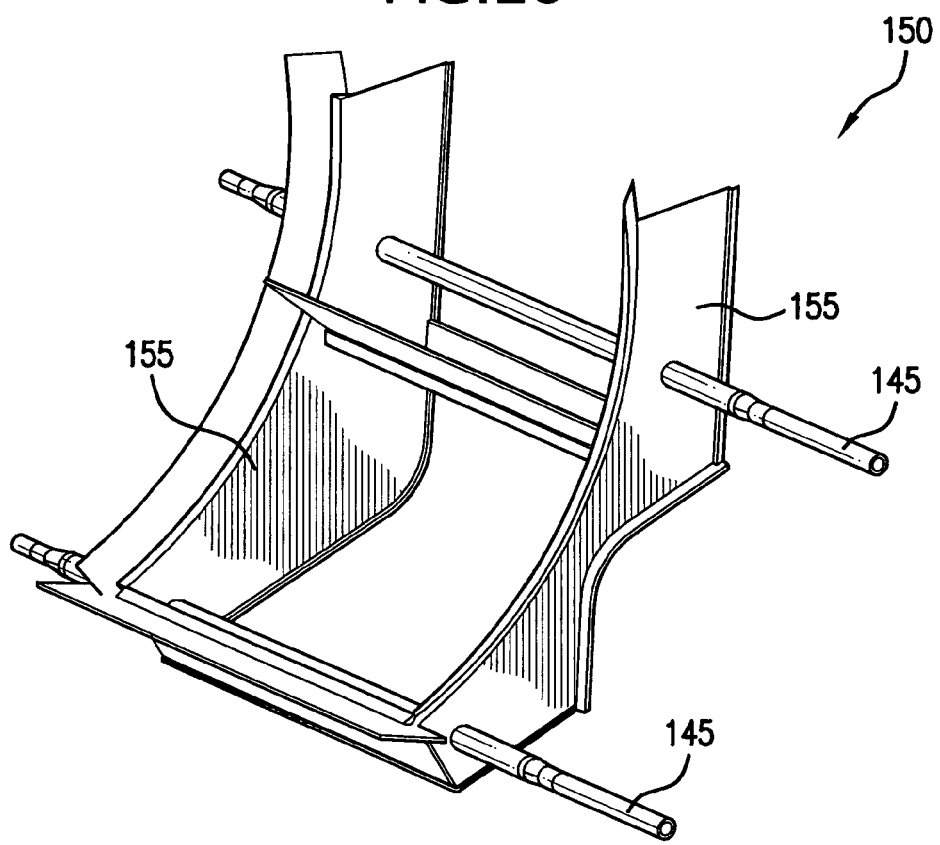
FIG. 27 is a back isometric view of the exhaust plenum shown in FIG. 26.
Figure 28:
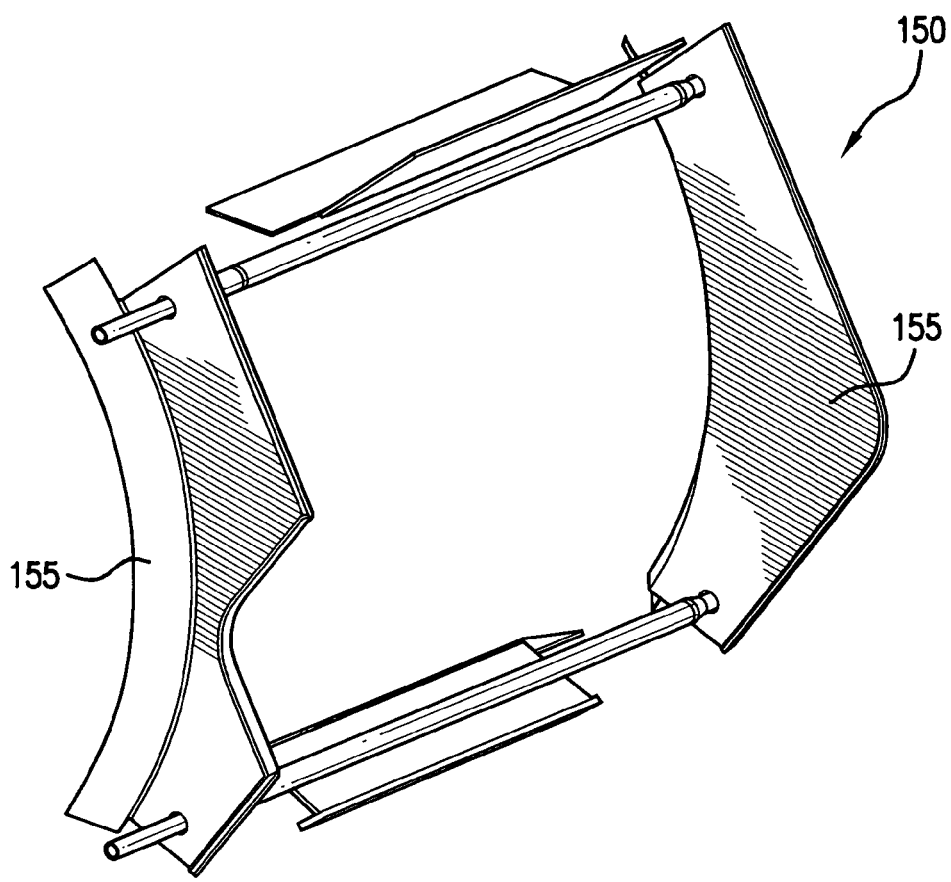
FIG. 28 is a side isometric exploded view of the exhaust plenum shown in FIG. 26.
Figure 29:
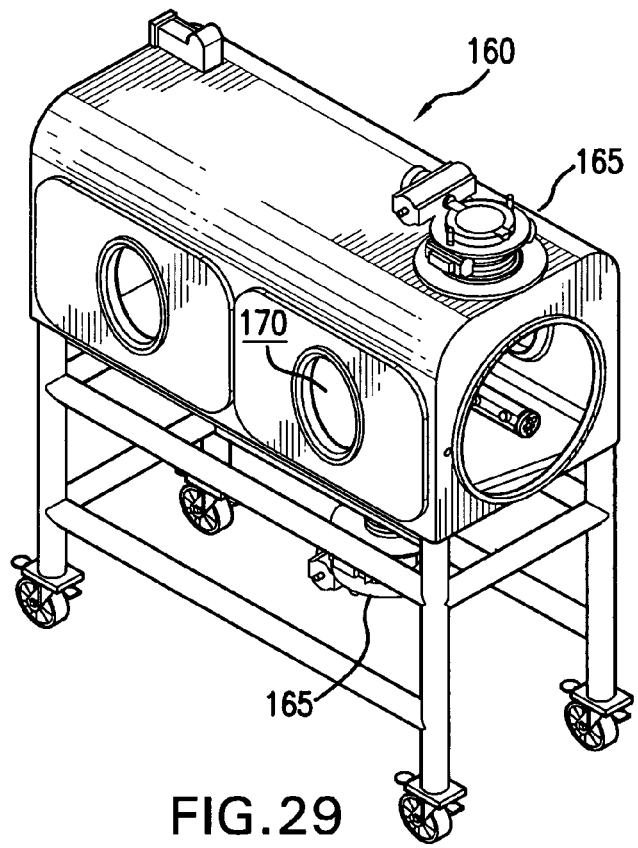
FIG. 29 is a front isometric view of an isolator used in connection with the coater described herein.
Figure 30:
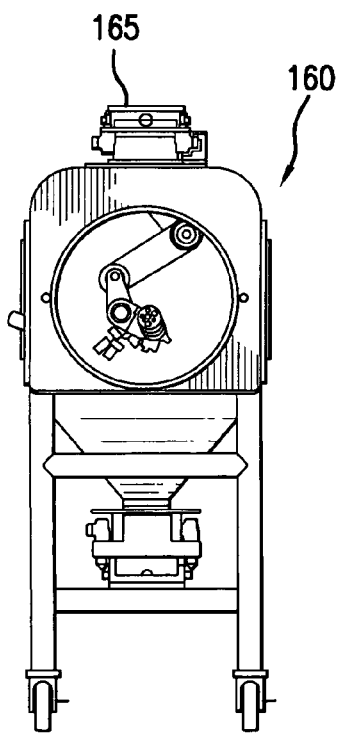
FIG. 30 is a front view of the isolator shown in FIG. 29.
Figure 31:
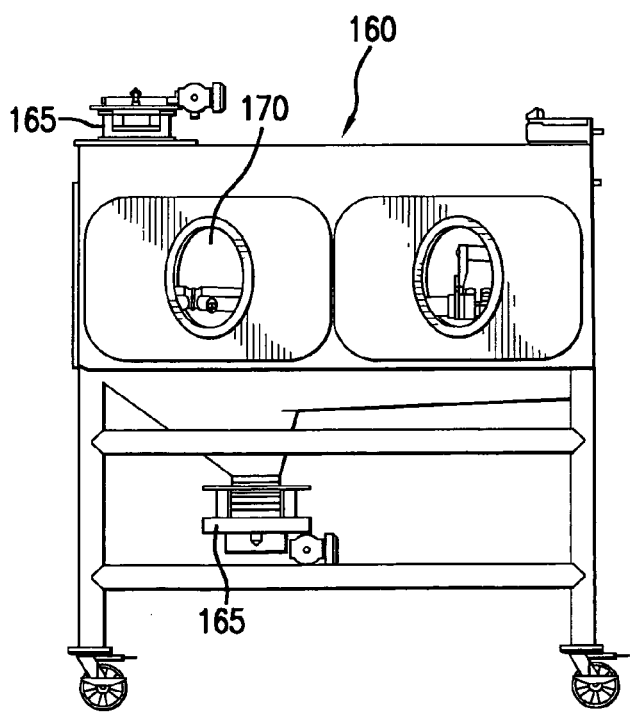
FIG. 31 is a side view of the isolator shown in FIG. 29.

It is a desirable feature of the present invention to permit in-room extraction of an empty or full coating drum 40 in less than thirty minutes and in-room insertion of a different coating drum 40 in less than thirty minutes. As an alternative to a forklift or gantry, a specially designed drum exchange dolly may used to facilitate extraction and replacement. FIG. 23 shows dolly 160 according to one preferred embodiment of this invention that is slideably engageable with cradle 60 for removal and support of cradle 60 from housing 30. Such process may be manual or automated for insertion and/or extraction.

Coater 20 according to this invention preferably additionally includes a viewing door, also referred to as a process port 100 herein, positioned within access door 80. Process port 100 preferably creates a viewable window into the coating chamber within coater 20 and/or mixing chamber 42 within drum 40 and also permits a user to position spray bar 120 from outside of coater 20 and gain access to material within coater 20. Process port 100 preferably covers access end 35 of drum 40 and provides key functions such as visual access, support and indexing of the spray bar, sampling access, lighting and instrumentation. Process port 100 is preferably openable within access door 80 which is independently openable. Process port 100 may be exchanged with alternatively configured process ports adapted to various methods of spray bar positioning and material handling. Process port 100 preferably includes a single-point attachment to an extraction arm resulting in ease of removal. Process port 100 may be replaced with an alternative configuration depending on a material handling approach (open/hybrid/closed/contained transfer).

Coater 20 according to this invention preferably permits coating under containment and may include an air-sealed mixing chamber 42, pneumatic seals and driveshaft containment seals that assist in docking coater 20 with container isolator 160, as described below. Such sealing means permit the coating of potent compounds without releasing toxic dust to the coating room. In addition, coater 20 may include a contained sampler further reducing the need for operators to wear personnel protection equipment (PPE) which affect ergonomics, operator comfort and productivity.

Figure 32:
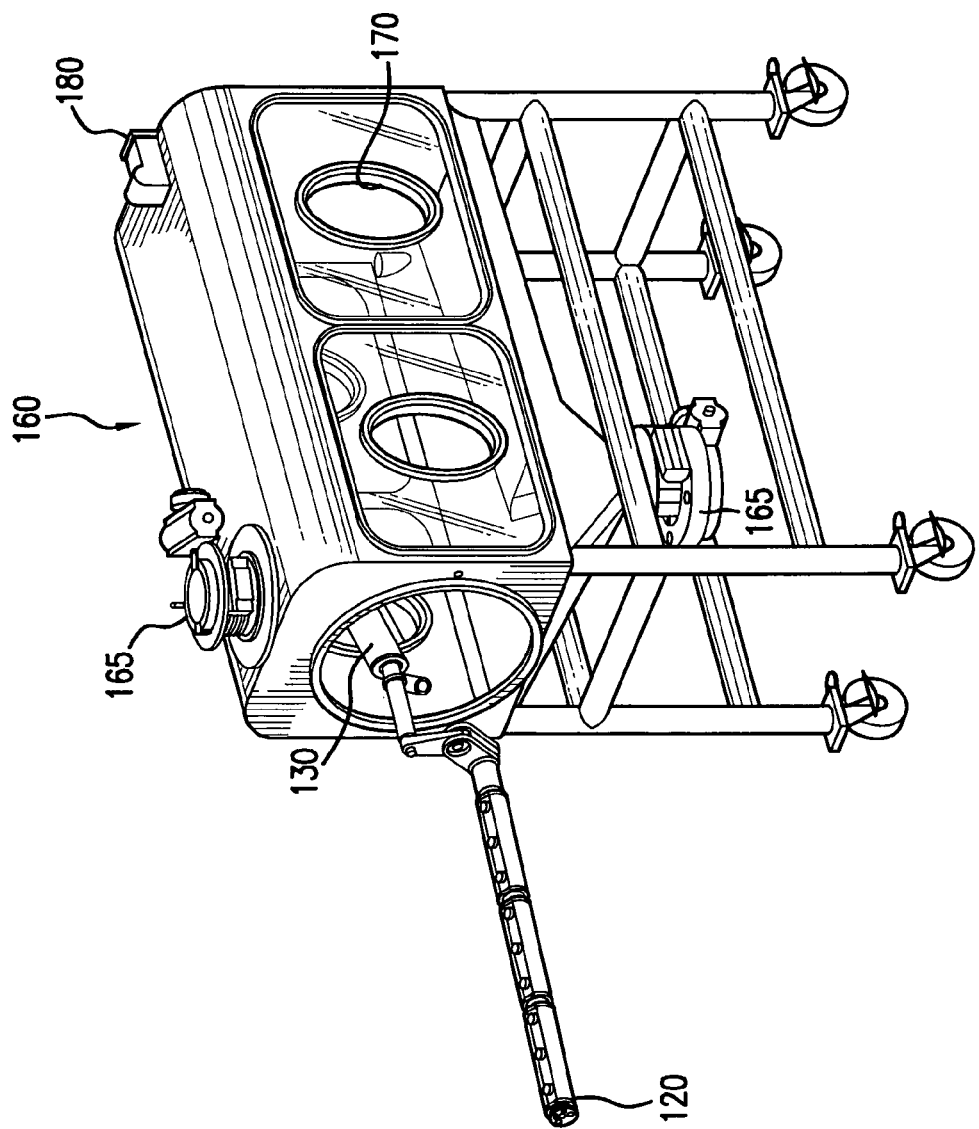
FIG. 32 is a side isometric view of the isolator shown in FIG. 29, showing an integrated spray bar in a fully extended position.
Figure 33:
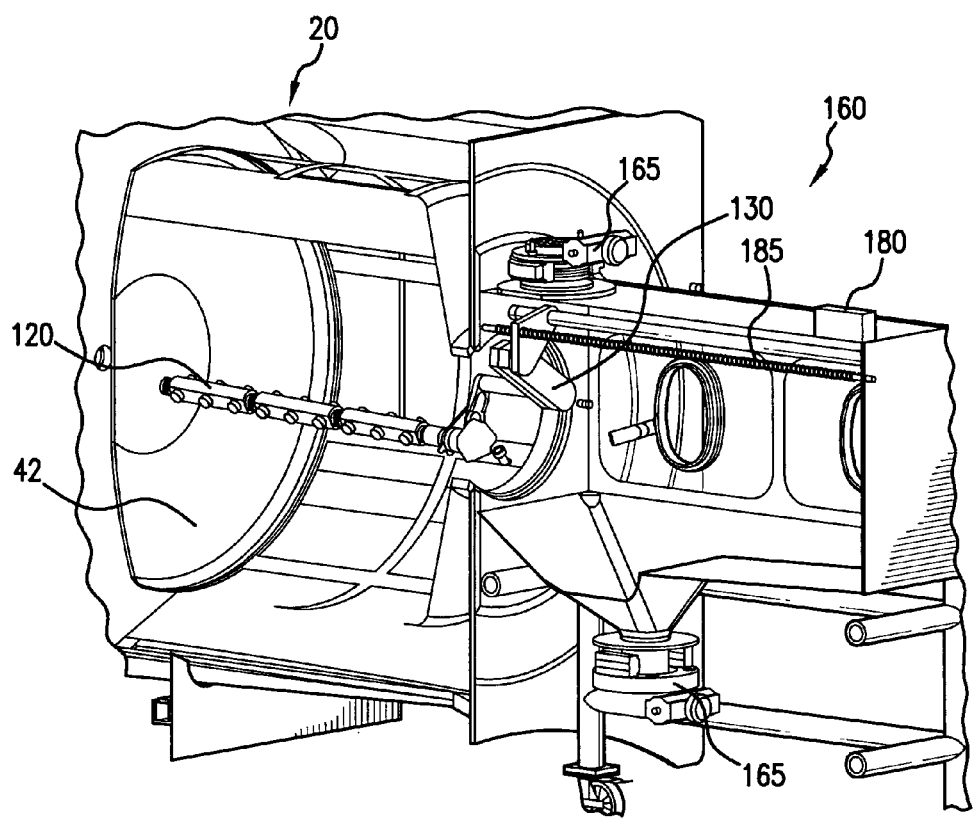
FIG. 33 is a side isometric cutaway view of the isolator shown in FIG. 29 docked with a coater according to one preferred embodiment of this invention.
Figure 34:
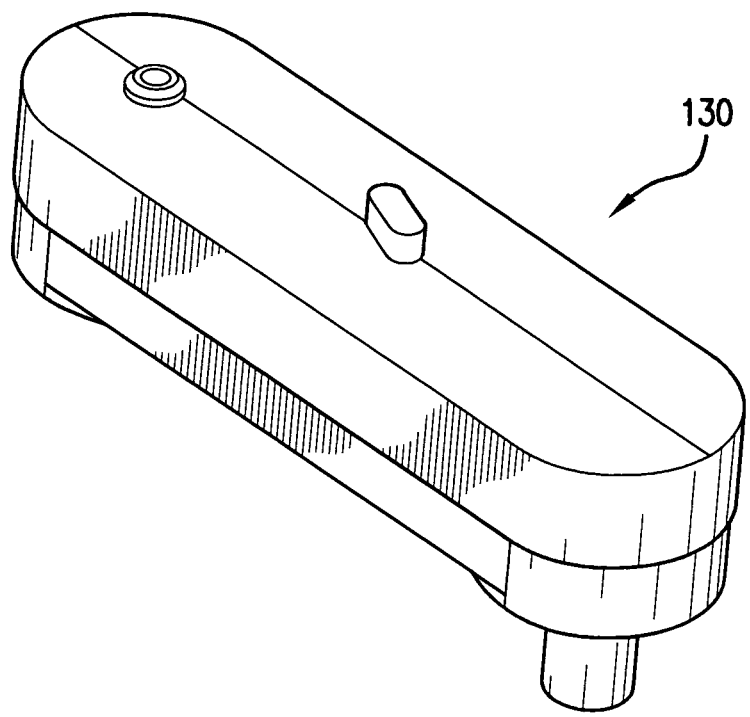
FIG. 34 is a side isometric view of an arm assembly according to one preferred embodiment of the invention.
Figure 35:
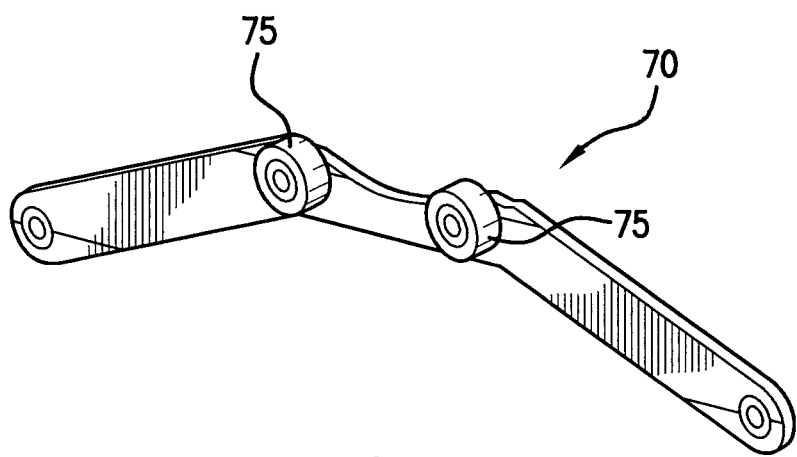
FIG. 35 is a side isometric view of a trunnion bar according to one preferred embodiment of the invention.

Containment isolator 160, such as shown in FIGS. 29-33, allows for the contained insertion and/or extraction of spray bar 120, as well as verification and maintenance. As best shown in FIGS. 32 and 33, spray bar 120 may include a motor assist for extension in and retraction from mixing chamber 42. Spray bar 120 may be extended along a drive rod 185 or similar arrangement to permit the contained extension of spray bar 120 into coater 20. Containment isolator 160 preferably includes glove ports 170 for handling material under containment during the loading and unloading process. Containment isolator 160 preferably further includes integrated product transfer devices 165, including material handling chutes and valves, butterfly valves, split-butterfly valves and rapid transfer ports, that all may assist in accommodating contained transfers. Such a system permits a switch between potent and non-potent products on the same coater.

The containment isolator 160 can be equipped with a video inspection system which provides visual access to the tablet bed and spray bar. The ability to insert/extract drum 40 full of uncoated cores or coated product allows off-coater, off-room material handling. This makes possible a much gentler handling of the product and makes coater 20 available for washing or receiving a clean drum for the next coating run or campaign.

Coater 20 may further permit coating with closed transfers. The exchangeable process ports 100 as described above may accommodate open transfers, hybrid transfers, closed transfers or contained transfers. Closed transfers reduce the release of coating dust to the coating room thereby reducing exposure of operators to coating dust. This also permits the operator to switch from one transfer method to another on a given coater. Current coating technology relies on open transfers which require continual maintenance and cleaning of coating rooms which are covered with dust released when transferring product to and from the coater. Ideally, the isolator 160 accommodates all functions related to containment (i.e., loading, unloading, sampling, wax addition, spray bar extraction).

As described, coater 20 according to a preferred embodiment of this invention further facilitates cleaning and maintenance of coater 20 and its constituent parts. Coater 20 preferably includes a rounded coating chamber unlike prior art coaters in which the coating chambers were mostly square. Coater 20 according to this invention preferably includes an open exhaust plenum 150, best shown in FIGS. 6 and 25-28 that stays in place for cleaning. In addition, coater 20 preferably includes multiple drains and independent drainage of coater 20, exhaust plenum 150 and tanks. Spray bar 120 preferably includes integrated nozzles to further facilitate cleaning. Coater 20 preferably includes integrated tanks (SLP, WIP) and assisted or automated cleaning of the tanks.

Coater 20 may additionally include integrated cleaning components such as: pumps for cleaning fluids (supply and return) that are integrated with the coater; holding tank(s) for cleaning fluids (city water, process water, purified water) that are mounted at the coater or integrated with the coater; detergent injection containers, piping and controls that are integrated with the coater; zone valves are integrated with the coater; and/or instrumentation and controls that are integrated with the coater. This arrangement also results in a highly space efficient coater because all cleaning components are mounted on the coater or at the coater instead of on separate skids in remote areas.

Coater 20 permits visual inspection for cleaning and maintenance including a coater front that opens either through access door 80 or through process port 100. The openable nature of coater 20 makes swab sites easier to reach than in conventional coaters.

Coater 20 preferably further includes exhaust ductwork that drains independently of coater 20. A horizontal or vertical exhaust plenum 150 preferably connects to a vertical duct equipped with a manual or automated drain and, as such, does not drain directly into the coater, minimizing the risk of cross-contamination between exhaust ductwork, drum and coater. In addition, the bypass preferably drains into the duct drain thereby reducing the time required for a "deep" system cleaning and further minimizing cross-contamination. In this manner, the exhaust plenum 150 ductwork can be cleaned after a coating run without having to clean coater 20. In addition, partial cleaning cycles are enabled by the described system.

A spray bar cart may be used in connection with the coater that comprises a mobile cart designed to support spray bar 120. This eliminates the need for spray bar 120 to be manually removed and cleaned, inspected and beakered out of place. This may be particularly useful because spray bar 120 is typically a heavy component and presents ergonomic challenges when handled manually. Beakers, air and solution spray/return, drainage may be available on the cart. In addition, coater 20 may include a software application that allows prompted, semi-automatic or automatic beakering, purging, flushing, verification, calibration and testing. Pattern checks may also be accommodated by the cart instead of being done in a laboratory, as done conventionally.

A mobile cleaning cart may be used in connection with coater 20 that includes cleaning nozzles, zone valves, detergent injection, pumps, tanks, instrumentation and controls. Such a mobile approach eliminates the need to equip each coater with a full complement of cleaning appurtenances as the cleaning cart can be shared among several coaters. The mobile cart for use with this invention preferably mates with the front coater opening (access door and/or process port) or the exhaust plenum access door.

Coater 20 may additionally include one or more integrated wash tanks. Wash tanks required to hold and/or recirculate process water and/or purified water are mounted to the coater or at the coater.

Titanium dioxide removal may additionally be facilitated by drum removal and transfer to a cleaning room instead of with the drum in place. As TiO2 may not be removed automatically by an automated wash-in-place procedure, this chemical residue must ordinarily be removed manually. The drum removal feature described herein allows the manual TiO2 removal to be performed off-coater when more time is available and trained cleaning operators are available. Inserting a clean coating drum in the coater allows the new coating run to proceed while the previous drum is being cleaned or inspected by QA.

According to a preferred embodiment of this invention, the process support functions are integrated with coater 20. Such process support functions include: solution preparation; solution delivery; material handling; weight reconciliation; and/or power charging. This integration saves space and cost and permits single stop procurement while facilitating integrated automation. In addition, as described, the wash subsystems are preferably integrated with coater 20 including the coating chamber and drum 40; process air bypass; exhaust duct 150; spray bar 120; solution delivery; solution tanks; and/or the CoP sink.

Automation features may be additionally integrated including: air handling; coating; solution handling; material handling; inter-stage activities; and/or inter-run activities. Such functions are not currently automated in conventional coaters. Finally, control components may be integrated with the coater, specifically all control components may be preferably mounted at the back of the coater instead of being housed in several remote control enclosures.

As described above, spray bar 120 for use with the coater preferably includes spray nozzle components that are manifolded inside solid spray bar sections in lieu of individual spray nozzles mounted on a manifold. Such a system is described in U.S. Pat. No. 6,739,526 issued on May 25, 2004 which is incorporated here by reference.

Coater 20 may further include a gun to bed distance (GTBD) monitoring system. The GTBD system may include a mechanical feeler with visual indication and/or an ultrasonic sensor with or without positioning feedback and/or other suitable type of automated sensor known to those having ordinary skill in the art, with or without positioning feedback. The GTBD system preferably results in a "recipe-controlled" feedback of GTBD rather than manual, operator dependent feedback and set-up. This allows automated adjustment of the spray bar to maintain a consistent GTBD while the bed grows.

An external positioning system may be adapted to coater 20 that permits movement and set-up of spray bar 120 from outside of housing 30. One such system includes external handwheels or motorized controls that enable positioning of the spray bar without opening the coater. Such a preferred device is shown in detail in FIG. 34 and may include one or more worm gears that permit the translation of movement from the external operator to spray bar 120 within mixing chamber 42.

Coater 20 may additionally include an openable exhaust plenum 150, as briefly described above and shown in FIGS. 6 and 25-28. According to this preferred embodiment, the coater side door 140 also comprises the back wall of exhaust plenum 150 instead of requiring a stand-alone, removable exhaust plenum 150. In this manner, exhaust plenum 150 can be washed in place manually or automatically. In addition, exhaust plenum 150 may be sized to accommodate the various drum sizes through an adjustable set of sidewalls best shown in FIG. 28. Sidewalls 155 may be slideably adjustable along rods 145 to permit exhaust plenum 150 to fit in association with a variety of drums 40. As such, the top and bottom surfaces of exhaust plenum 150 are replaced to accommodate the change in width.

Coater 20 according to this invention further includes means for taking bed temperature measurements. Preferably such means include an infra-red sensor permanently mounted capable of measuring actual process temperature (bed) instead of inlet temperature which is measured at a distance from the bed and is inferential to the process. In addition, the process permits automated temperature feedback on the inlet air handler.

The coater as shown and described preferably includes: 1. drum exchangeability; 2. enhanced utilization of a coater 3. flexible utilization of a coater; 4. efficient and affordable wash features; 5. automated wash; and/or 6. integrated operations. Preferred uses for a coater as shown and described include: 1. Closed transfers; 2. Contained transfers; 3. Coating under containment; 4. Off-coater material handling; 5. Drum-to-drum product transfer; and/or 6. Off-coater drum cleaning.

The coater according to this invention preferably is used in connection with a cleaning/storage room where the various replacement coating drums will be inspected, maintained and stored. If the coating drums are cleaned out-of-place, such a system may require an optional or additional drum washer in a cleaning/storage room.

The preferred embodiments are thus adaptable to coating with a multitude of solutions or suspension, including those having relatively high viscosity, as high as 400 centipoise or perhaps higher, and suspensions having as much as 40 percent solids. For simplicity, throughout this application, Applicant has referred to solutions and suspensions as "solutions," and the text is to be understood as encompassing both. Additionally, temperatures during the coating process can be greater than 200 degrees Fahrenheit, although many pharmaceutical applications are conducted at room temperature. Thus, a coating apparatus for coating a material to be coated with a solution is disclosed, preferably for coating pharmaceuticals.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A coater for coating a material with a solution or a suspension, the coater comprising:
   a housing;
   a motor;
   a drum removably connected with respect to the motor, the drum having an annular flange at an access end and a drive end opposite the access end;
   a support positioned under the annular flange of the drum at the access end and within the housing, the support permitting rotation of the access end of the drum and wherein the support is removable to facilitate removal and replacement of the drum;
   a coupling positioned with respect to the drive end of the drum, the coupling permitting rotation of the drum relative to the housing;
   an access door positioned in the housing at the access end of the drum and permitting removal and replacement of the drum;
   a spray bar extending into a mixing chamber of the drum to coat the material with the solution or the suspension;
   a cradle supporting the drum removably positioned within the housing to facilitate removal and replacement of the drum with a replacement drum having a different size, the support integrated along an end of the cradle to support the access end of the drum and a slot integrated along an opposite end of the cradle to support the drive end of the drum; and
   a dolly slideably engageable with the cradle for removal and support of the cradle from the housing, the dolly including a plurality of wheels to permit the dolly to slide in and out of the housing.

2. The coater of claim 1 further comprising:
   a plurality of rollers positioned along the cradle to permit the cradle to slide in and out of the housing.

3. The coater of claim 1, further comprising:
   one or more rollers positioned on the support to permit rotation of the drum relative to the support.

4. The coater of claim 1 wherein the drum includes a capacity of at least 100 liters.

5. The coater of claim 1 wherein a second drum is exchangeable with the drum, the second drum having a capacity at least twice as large as the drum.

6. The coater of claim 1 further comprising:
a process port positioned within the access door, the process port separately openable within the access door.

7. The coater of claim 1, wherein the coupling is removably attached to the motor.

8. The coater of claim 1, wherein a position of the spray bar is adjustable from an outside of the housing.

9. The coater of claim 8, wherein the location of the spray bar with respect to the material being coated is adjustable from the outside of the housing.

10. The coater of claim 9 further including:
a gun to bed distance monitoring system.

11. A coater for coating a material with a solution or a suspension, the coater comprising:
a housing;
a removable cradle including a support and a slot positioned within the housing;
a dolly slideably engagable with the cradle for removal and support of the cradle from the housing, the dolly including a plurality of wheels to permit the dolly to slide in and out of the housing;
a first drum including an annular flange at an access end, the first drum positioned on the cradle and supported at the access end with the support and supported at a drive end by the slot, wherein the cradle facilitates removal of and replacement of the first drum with a second drum having a different size than the first drum;
an access door positioned at the access end of the first drum and permitting removal of the cradle and replacement of the first drum with the second drum; and
a spray bar extending into a mixing chamber of the drum to coat the material with the solution or the suspension.

12. The coater of claim 11 further comprising:
a process port connected within the access door, the process port permitting access to a mixing chamber of the first drum.

13. The coater of claim 11 wherein the second drum includes at least twice the capacity of the first drum.

14. The coater of claim 11 further comprising:
a plurality of baffles positioned within the first drum, the plurality of baffles adjustable from outside of the housing.

15. A coater for coating a material with a solution or a suspension, the coater comprising:
a housing;
a drum positioned to rotate within the housing and removably attached within the housing, the drum having an annular flange positioned at an access end aligned toward a front of the housing and a drive end positioned opposite to the access end;
a cradle positioned under the drum, wherein the cradle facilitates removal and replacement of the drum with a replacement drum having a different size, the cradle including a slot to support the drive end of the drum;
a dolly slideably engageable with the cradle for removal and support of the cradle from the housing, the dolly including a plurality of wheels to permit the dolly to slide in and out of the housing;
a support positioned within the housing, the support positioned under the annular flange at the access end and permitting rotation of the access end of the drum, and wherein the support is removable to facilitate removal and replacement of the drum;
a coupling positioned with respect to the drive end, the coupling permitting rotation of the drum relative to the housing;
an access door positioned in the housing at the access end of the drum and permitting removal and replacement of the drum, the access door sized larger than a diameter of the drum; and
a spray bar extending into a mixing chamber of the drum to coat the material with the solution or the suspension.

* * * * *